(12) United States Patent
Sato et al.

(10) Patent No.: US 6,506,988 B2
(45) Date of Patent: Jan. 14, 2003

(54) INHIBITOR SWITCH

(75) Inventors: Syunichi Sato, Tokyo (JP); Tsutomu Watada, Tokyo (JP)

(73) Assignee: Niles Parts Co., Ltd. (JP)

( * ) Notice: Subject to any disclaimer, the term of this patent is extended or adjusted under 35 U.S.C. 154(b) by 1 day.

(21) Appl. No.: 09/801,810

(22) Filed: Mar. 9, 2001

(65) Prior Publication Data

US 2001/0020575 A1 Sep. 13, 2001

(30) Foreign Application Priority Data

Mar. 10, 2000 (JP) .................................. 2000-067645

(51) Int. Cl.⁷ ................................................. H01H 9/06
(52) U.S. Cl. .................................. 200/61.88; 200/61.28
(58) Field of Search ................ 200/61.28, 61.88–61.91; 335/205–207

(56) References Cited

U.S. PATENT DOCUMENTS

| | | | | |
|---|---|---|---|---|
| 5,703,552 A | * | 12/1997 | Buffet et al. | ................. 335/205 |
| 5,828,023 A | * | 10/1998 | Nakazawa | ................ 200/61.88 |
| 5,913,935 A | | 6/1999 | Anderson et al. | ............. 74/335 |
| 5,969,519 A | | 10/1999 | Steiling et al. | ............. 324/207 |
| 6,140,898 A | * | 10/2000 | Satoh et al. | ................. 335/207 |

FOREIGN PATENT DOCUMENTS

| | | | |
|---|---|---|---|
| EP | 911 550 | * | 4/1999 |
| JP | 55-101623 | | 7/1980 |
| JP | 6-147 316 | * | 5/1994 |
| JP | 11-108 182 | * | 4/1999 |
| WO | WO 92/17719 | | 10/1992 |

OTHER PUBLICATIONS

European Search Report for Application No. EP 01 10 5669 dated Jun. 18, 2001.

* cited by examiner

*Primary Examiner*—Lincoln Donovan
*Assistant Examiner*—Lisa N Klaus
(74) *Attorney, Agent, or Firm*—Rader, Fishman & Grauer PLLC; Ronald P. Kananen

(57) ABSTRACT

An inhibitor switch is disclosed, including a permanent magnet and a magnetic sensor which detects a magnetic force of the permanent magnet in a non-contacting state and outputs a linear change in a voltage value in response to a change in a relative position between the permanent magnet and the magnetic sensor. One of the permanent magnet and the magnetic sensor is mounted on a manual valve shaft side for changing over change gear range positions of an automatic transmission by operating a manual valve of the automatic transmission in an interlocking manner with the manual valve shaft. The other one of the permanent magnet and the magnetic sensor is mounted on a transmission case side of the automatic transmission. The change gear range position of the automatic transmission is detectable in response to an output of the voltage value corresponding to the change gear range position.

7 Claims, 15 Drawing Sheets

INHIBITOR SWITCH

BACKGROUND OF THE INVENTION

1. Field of the Invention

The present invention relates to an inhibitor switch for detecting change gear range positions of an automatic transmission.

2. Description of the Related Art

Conventionally, as an inhibitor switch, there has been an inhibitor switch which makes a movable contact rotating along with an axial rotation of a manual valve shaft of an automatic transmission slidably moved relative to a fixed contact mounted on a transmission case side of the above mentioned automatic transmission and detects the changeover of a change gear range of the automatic transmission in response to the position of the movable contact to the fixed contact. With respect to the detection using such a slidable contact, there has been a problem that the contact control of the surface of the contact is extremely difficult and hence, there are so much noise signals that the control with a microcomputer becomes difficult.

To the contrary, an inhibitor switch adopting a non-contacting method can eliminate noise signals derived from the contacting and hence, it is suitable for the control using a microcomputer. As such an inhibitor switch adopting the non-contacting method, there has been an inhibitor switch which provides magnetic sensors at respective change gear positions and detects the changeover of the change gear range based on ON/OFF signals of respective sensors or an inhibitor switch which reduces the number of the magnetic sensors and detects the changeover of the change gear range based on the combination of signals of the magnetic sensors.

As the inhibitor switch which provides magnetic sensors at respective change gear positions, there has been an inhibitor switch shown in FIG. 18 to FIG. 20, which is described in Japanese Utility Model Publication No. 101623/1980, for example. To briefly explain the constitution of the inhibitor switch first of all, a rotary element 105 is mounted on a manual valve shaft 103 of an automatic transmission 101 and a permanent magnet 107 is supported on the rotary element 105. Further, on a housing 109 side of the automatic transmission 101, magnetic sensors 111 which are arranged corresponding to change gear range positions are supported. These magnetic sensors 111 are constituted by lead switches.

Then, when the permanent magnet 107 is moved due to the rotation of the manual valve shaft 103 in response to the changeover of the change gear range, a contact of any one of magnetic sensors 111 which faces this permanent magnet 107 in an opposed manner is closed and any one of the change gear range positions can be detected by reading the resistance values connected to respective magnetic sensors 111 which are different each other.

However, in such a structure, it is necessary to provide the magnetic sensors 111 at respective change gear positions so that the number of magnetic sensors becomes large and there exits a limit with respect to the miniaturization of the inhibitor switch. Accordingly, it has been almost difficult to arrange the inhibitor switch in the inside of a transmission case.

Further, the inhibitor switch having the above mentioned structure has a problem that there exists a limit with respect to an accurate detection. That is, when the manual valve shaft 103 is rotated due to the transmission manipulation and the permanent magnet 107 is moved between respective magnetic sensors 111 in response to this rotation, at an intermediate position between these magnetic sensors 111, a state that the magnetic sensors 111 disposed in front of and behind the magnetic sensor 107 turn OFF or a state that both of such magnetic sensors 111 turn ON may arise. When both of the magnetic sensors 111 turn OFF, it is impossible to detect where the change gear range position of the automatic transmission 101 exists while when both of the magnetic sensors 101 turn ON, it becomes impossible to detect which position the change gear range exists.

Accordingly, in the state that the permanent magnet 107 is disposed in such an intermediate position, when the inhibitor switch suffers from a failure, it has been impossible to detect the change gear range position where the failure occurs so that the detection accuracy is low. Accordingly, the detection having an improved reliability has been requested.

In the inhibitor switch which reduces the number of magnetic sensors and performs the detection based on the combination of signals of the magnetic sensors, by changing the combination of sensor signals at respective change gear range positions, the reliability of the inhibitor switch when the sensor suffers from the failure can be enhanced. That is, in the above-mentioned structure which turns ON/OFF the magnetic sensors 111 of respective change gear ranges, when any one of the magnetic sensors 111 is connected due to a failure such as a short-circuiting or the like, even when a shift lever is manipulated from N (neutral range) to D (drive range), there is a possibility that a signal indicative of P (parking range) is outputted or the like. With use of the above-mentioned combination of signals, such an erroneous outputting can be suppressed.

However, only with the mere combination of several kinds of signals corresponding to the change gear range positions, when any one of the magnetic sensors suffers from the failure, it gives rise to a common combination mode at different change gear range positions and there is a possibility that the correct signals can not be distinguished from error signals. Accordingly, in a usual case, the combination modes are prevented from becoming in common with the use of a combination signal which is added with one bit to the combination signal.

That is, when the combination modes of signals are made in common at different change gear ranges due to the failure and hence, a signal that the change gear range is changed directly from P to N is outputted or the like, it is possible to distinguish the correct signals from error signals by storing conditions that there is no possibility that the change gear range is directly shifted from P to N into the microcomputer. However, at an end portion such as P, even when the shift lever is not manipulated, a signal that the change gear range is shifted from P is outputted and hence, there is a possibility that the accurate signal can not be distinguished from the error signal. Accordingly, in a usual case, the provision is made such that one bit is added to the combination signal so that even when any one of the magnetic sensors suffers from the failure, signals which agree with each other are not generated at respective detection positions. Accordingly, the number of magnetic sensors is increased correspondingly so that it also gives rise to a problem that the inhibitor switch becomes large-sized.

Further, the inhibitor switch also has a problem that the detection accuracy at the intermediate position is low as in the case of the previously-mentioned inhibitor switch.

SUMMARY OF THE INVENTION

It is an object of the present invention to provide an inhibitor switch, which can miniaturize the constitution thereof and also can remarkably enhance the detection reliability.

The inhibitor switch according to the present invention has the following characteristics.

(1) The inhibitor switch according to the present invention comprises a permanent magnet and a magnetic sensor which detects a magnetic force of the permanent magnet in a non-contacting state and outputting a linear change in a voltage value in response to a change in a relative position between the permanent magnet and the magnetic sensor, wherein either one of the permanent magnet and the magnetic sensor is mounted on a manual valve shaft side for changing over a change gear range position of the automatic transmission by operating a manual valve of the automatic transmission in an interlocking manner with the manual valve shaft, and the other one of the permanent magnet and the magnetic sensor is mounted on a transmission case side of the automatic transmission, and the change gear range position of the automatic transmission is detectable in response to an output of the voltage value corresponding to the change gear range position.

(2) In the inhibitor switch as set forth in section (1), the permanent magnet is mounted in a ring form on a movable element made of a non-magnetic material which is supported such that it is integrally rotatable with the manual valve shaft, and the magnetic sensor is mounted on a pole base made of a non-magnetic material which is fixedly supported on the transmission case side.

(3) In the inhibitor switch as set forth in section (2), the permanent magnet has a magnetic boundary surface between an S pole and an N pole, and the permanent magnet is arranged relative to the magnetic sensor using the boundary surface as a reference position and the permanent magnet is capable of performing a relative rotation to the magnetic sensor in the directions of both sides of the boundary surface.

(4) In the inhibitor switch as set forth in section (3), a stopper is provided between the pole base and the movable element so as to set the relative rotation of the permanent magnet to the magnetic sensor within a predetermined angle.

(5) In the inhibitor switch as set forth in any one of sections (2) to (4), a lead terminal of the magnetic sensor has a distal end thereof pulled into a recessed portion formed in an outer surface of the pole base and a distal end of a connector terminal for an external connection which is supported on the pole base is pulled into the recessed portion and is electrically connected to the distal end of the lead terminal, and the recessed portion is sealed with resin.

(6) In the inhibitor switch as set forth in any one of sections (2) to (4), the pole base is formed of resin by molding and the magnetic sensor is arranged in the pole base in an embedded form by an insert molding.

(7) In the inhibitor switch as set forth in section (2), a plurality of the magnetic sensors are provided corresponding to the number of magnetic boundary surfaces of the permanent magnet.

In the invention as set forth in section (1), the linear change in the voltage value is outputted in response to the change in the relative position of the permanent magnet and the magnetic sensor corresponding to an axial rotation of the manual valve shaft and the change gear range position of the automatic transmission can be detected by an output of the voltage value corresponding to the change gear range position so that the change gear range position of the automatic transmission can be surely detected due to the change in the voltage value. Further, even in an intermediate state shifting to each change gear range position, the linear change in the voltage value can be outputted so that it becomes possible to accurately detect an interval between change gear range positions in which the permanent magnet or the magnetic sensor is currently being shifted. Due to such a constitution, even when the inhibitor switch suddenly suffers from a failure, the position and the change gear direction of the permanent magnet or the magnetic sensor at the time of the occurrence of the failure can be accurately judged so that the change gear range of the automatic transmission can be properly controlled whereby the reliability of the inhibitor switch can be remarkably enhanced. Further, the number of the magnetic sensor may be reduced to one so that the inhibitor switch can be largely miniaturized as a whole.

In the invention as set forth in section (2), in addition to the advantageous effect of the invention as set forth in section (1), since the permanent magnet is mounted on the movable element made of a non-magnetic material which is supported such that it is integrally rotatable with the manual valve shaft and the magnetic sensor is mounted on the pole base made of a non-magnetic material supported on the transmission case side, the permanent magnet performs the relative rotation thereof to the magnetic sensor in response to the axial rotation of the manual valve shaft so that the linear change in the voltage value can be accurately outputted whereby a further accurate detection can be performed.

In the invention as set forth in section (3), in addition to the advantageous effect of the invention as set forth in section (2), since the permanent magnet has the magnetic boundary surface between the S pole and the N pole, and the permanent magnet is arranged relative to the magnetic sensor using the boundary surface as the reference position and performs the relative rotation to the magnetic sensor in both side directions of the boundary surface, the linear change in the voltage value can be ensured in a wide range so that the change in voltage value at each change gear range position can be easily distinguished whereby a further accurate detection can be performed.

In the invention as set forth in section (4), in addition to the advantageous effect of the invention as set forth in section (3), since the stopper which sets the relative rotation of the permanent magnet to the magnetic sensor within the predetermined angle is provided between the pole base and the movable element, the voltage value can be surely detected within a range of the linear change so that a further accurate detection can be performed.

In the invention as set forth in section (5), in addition to the advantageous effect of the invention as set forth in any one of sections (2) to (4), since the lead terminal of the magnetic sensor has the end portion thereof pulled into the recessed portion formed in the outer surface of the pole base, the distal end of the connector terminal for an external connection supported on the pole base is pulled into the inside of the recessed portion and is electrically connected to the distal end of the lead terminal and the recessed portion is sealed with resin, the magnetic sensor can be mounted on the pole base thereafter so that the freedom of assembly can be increased.

In the invention as set forth in section (6), in addition to the advantageous effect of the invention as set forth in any one of sections (2) to (4), since the pole base is formed with resin by molding and the magnetic sensor is arranged in the inside of the pole base in an embedded form by an insert molding, even when oil or the like intrudes into the inside of the pole base, there is no possibility that the oil or the like comes into contact with the magnetic sensor so that a further accurate detection becomes possible. Further, the accuracy of the assembled position of the magnetic sensor is enhanced so that a further accurate detection is possible.

In the invention as set forth in section (7), in addition to the advantageous effect of the invention as set forth in section (2), since a plurality of magnetic sensors are provided corresponding to the number of the magnetic boundary surfaces of the permanent magnet, the linear changes of the voltage values can be detected by respective magnetic sensors and the change gear range positions can be detected by integrating these voltage values so that a further accurate detection can be performed. Further, even when any one of the magnetic sensors suffers from a failure, the linear change in the voltage value can be accurately outputted with use of other magnetic sensor so that the detection of the change gear position can be continued.

DESCRIPTION OF THE PREFERRED EMBODIMENTS

First Embodiment

Figure 1:
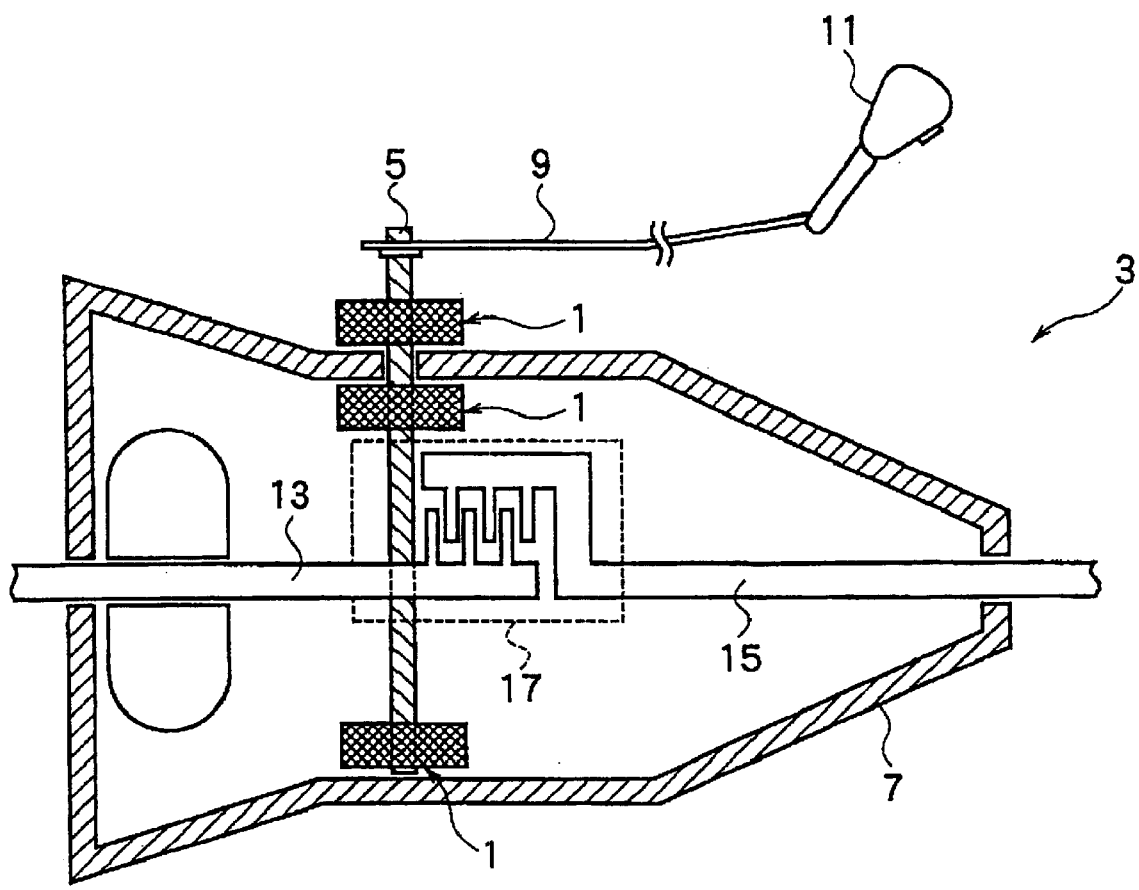
FIG. 1 is a schematic cross-sectional view of an automatic transmission showing the arrangement of inhibitor switches according to a first embodiment of the present invention.

FIG. 1 shows the arrangement position of an inhibitor switch 1 according to a first embodiment of the present invention. Although three inhibitor switches 1 are shown simultaneously in FIG. 1, it is not always necessary to provide three inhibitor switches 1 simultaneously and the inhibitor switch 1 can be selectively arranged at any one of these positions.

The above-mentioned magnetic sensor 1 is mounted between a manual valve shaft 5 side of an automatic transmission 3 and a transmission case 7 side of the automatic transmission 3. The above-mentioned manual valve shaft 5 is provided for changing over the change gear range position of the automatic transmission 3 in an interlocking manner with a manual valve of the above-mentioned automatic transmission 3. A shift lever 11 is connected to the manual valve shaft 5 in an interlocking manner by way of a connecting lever 9. Accordingly, upon manipulation of the shift lever 11, the manual valve shaft 5 is rotated by way of the connecting lever 9 and due to the rotation of this manual valve shaft 5, the change gear range position of the automatic transmission 3 can be changed over in an interlocking manner with the manual valve. Here, the automatic transmission 3 includes an input shaft 13 which performs an inputting of an output from an engine, an output shaft 15 which performs an outputting, and a change gear mechanism 17 which transmits the rotation from the input shaft 13 to the output shaft 15 in a change gear mode.

Figure 2:
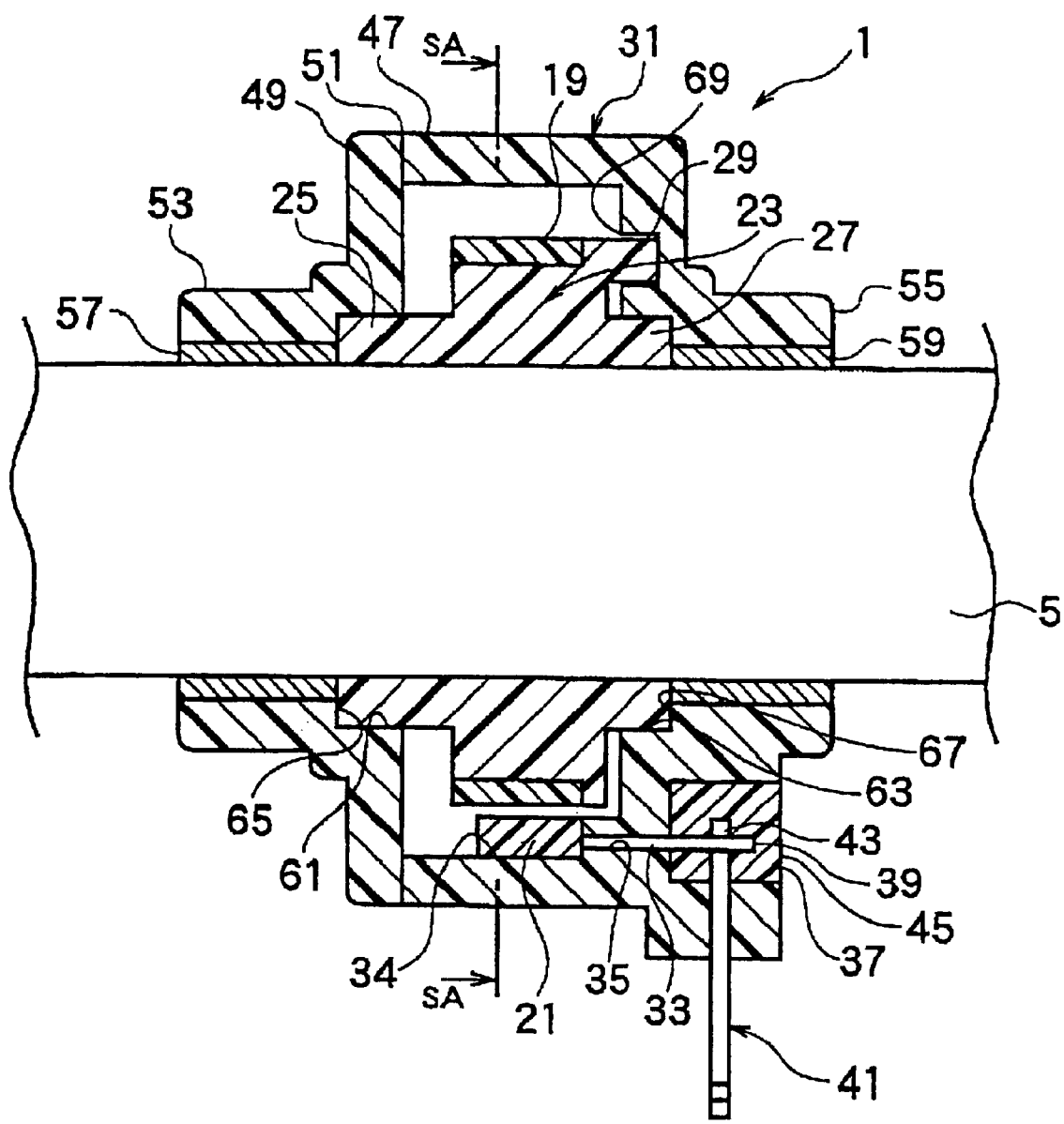
FIG. 2 is a whole cross-sectional view according to the first embodiment.
Figure 3:
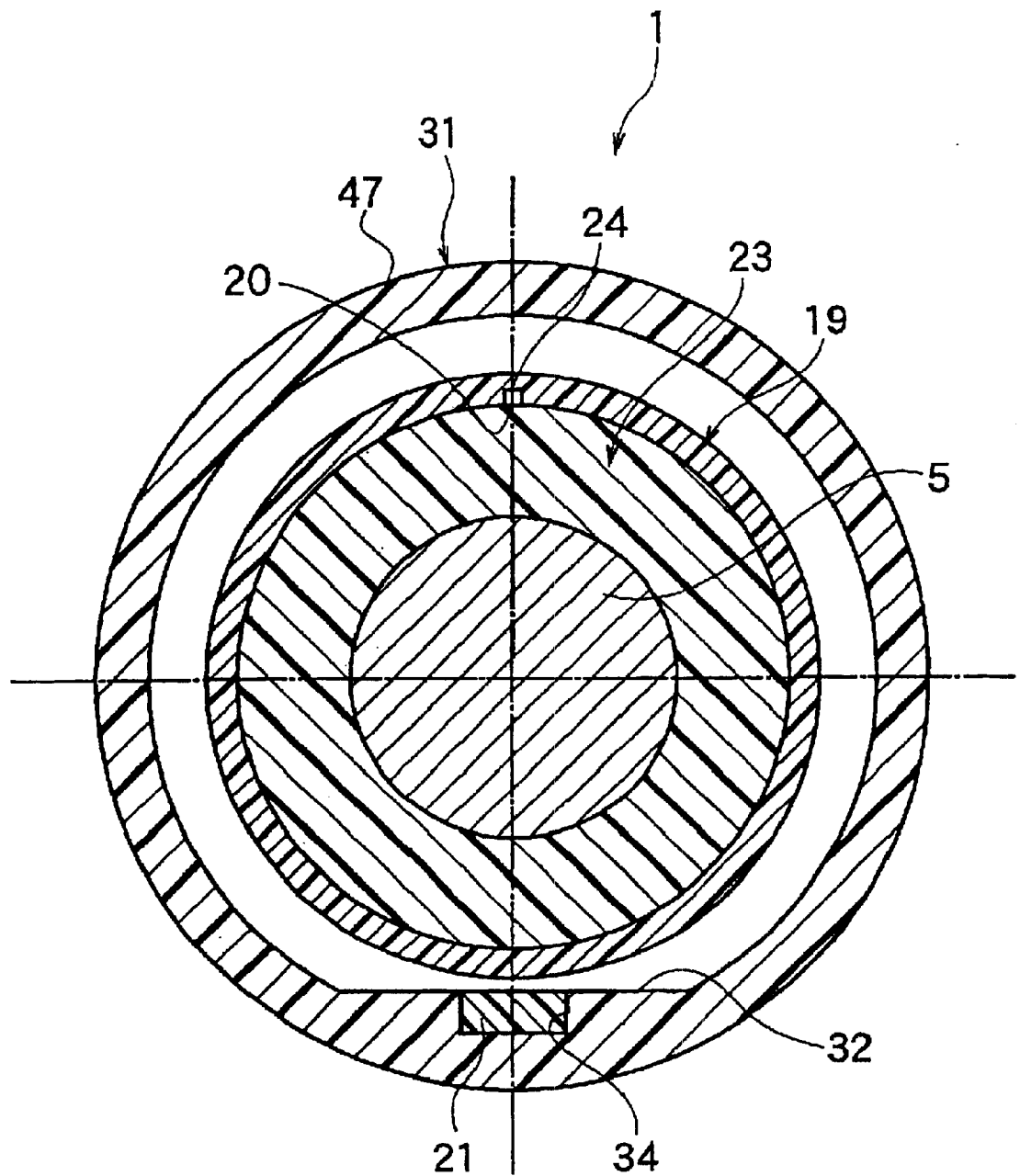
FIG. 3 is a cross-sectional view as viewed from a line SA—SA of FIG. 2.

The inhibitor switch 1 mounted on any one of the above-mentioned positions is provided with a permanent magnet 19 and a magnetic sensor 21 which detects a magnetic force of the permanent magnet 19 in a non-contacting state as illustrated in FIG. 2 which shows a whole cross-section of the inhibitor switch 1 and FIG. 3 which shows a cross-section taken along a line SA—SA of FIG. 2.

The above-mentioned permanent magnet 19 is a plastic magnet formed of PPS resin doped with neodymium by molding and is formed in a ring shape by a complexion molding, an injection molding or the like. A recessed portion 20 is formed in a portion of the permanent magnet 19. This permanent magnet 19 is supported on a movable element 23 made of a non-magnetic material such that the permanent magnet 19 can be rotated integrally with a movable element 23.

The above-mentioned movable element 23 is formed of PPS resin, PBT resin, nylon or the like, for example. A protruding portion 24 is formed on this movable element 23. At the time of assembling, by axially fitting the protruding portion 24 into the above-mentioned recessed portion 20, the positioning of the permanent magnet 19 relative to the movable element 23 in the rotational direction can be performed. Here, with the use of a magnetic material for an injection molding as a material for the permanent magnet 19 and by forming the permanent magnet 19 and the movable element 23 by an integral molding such as a double molding or a two-color molding, the positional accuracy can be enhanced.

The above-mentioned movable element 23 is constituted such that it is fixedly fitted on the above-mentioned manual valve shaft 5 and is integrally rotated with the manual valve shaft 5. Accordingly, the above-mentioned permanent magnet 19 is constituted such that the permanent magnet 19 is mounted on the manual valve shaft 5 side by way of the movable element 23. Shoulder portions 25, 27 are formed on the movable element 23 in a protruding manner in the axial direction. Further, a protruding portion 29 which works as a stopper is formed at an approximately same outer peripheral position at which the above-mentioned permanent magnet 19 is mounted.

The above-mentioned magnetic sensor 21 is constituted by a Hall element, a Hall IC, an MR element or the like, for example. When the Hall element is used as the magnetic sensor 21, an outside amplifier circuit is provided. Further, when the MR element is used as the magnetic sensor 21, an outer amplifier circuit may be provided.

The above-mentioned magnetic sensor 21 is arranged at an outer peripheral side of the permanent magnet 19 with a given clearance and is assembled into a recessed portion 34 of a pole base 31 made of a non-magnetic material. Here, the pole base 31 is supported on an inner wall side or an outer wall side of the above-mentioned transmission case 7 as shown in FIG. 1.

A lead terminal 33 of the above-mentioned magnetic sensor 21 has a distal end 39 thereof pulled out through an insertion hole 35 formed in the pole base 31 into a recessed portion 37 formed in an outer surface of the pole base 31. Further, a terminal 43 of a connector terminal 41 for an external connection which is integrally supported on the above-mentioned pole base 31 by an insert molding is pulled into the above-mentioned recessed portion 37 and is electrically connected to the distal end 39 of the above-mentioned lead terminal 33 by soldering or the like. The recessed portion 37 is sealed with resin 45 such as epoxy resin, urethane resin or the like.

Figure 4:
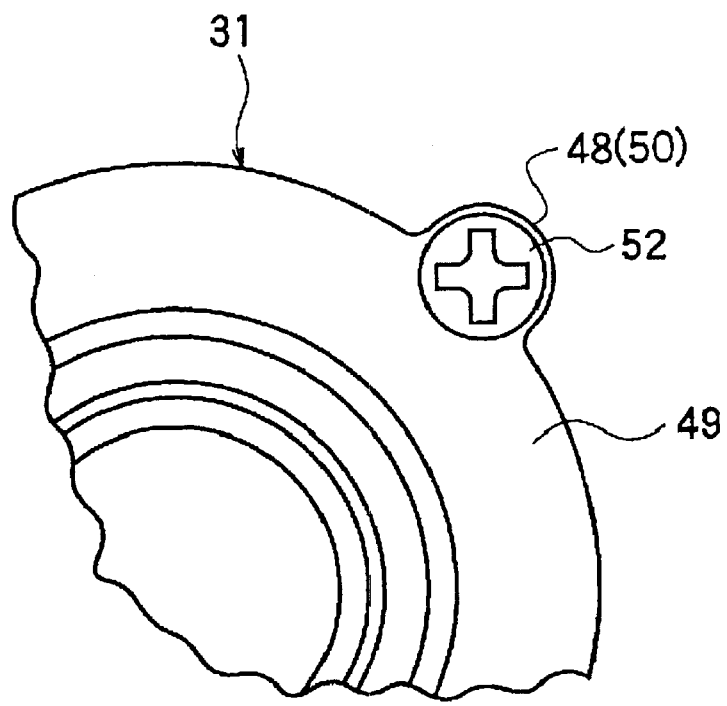
FIG. 4 is a side view of an essential part showing joining of a,pole base according to the first embodiment.

The pole base 31 is formed by joining a body 47 and a lid body 49 at a joining surface 51. As shown in FIG. 4 which is a partial side view, for example, this joining is performed by fastening flange portions 48 (50) which are formed on the lid body 49 and the body 47 at a given interval in a circumferential direction from each other by means of small bolts 52. However, the body 47 and the lid body 49 may be welded by a technique such as a supersonic welding, a slide welding or the like.

As shown in FIG. 2 and FIG. 3, the above-mentioned pole base 31 is provided with support portions 53, 55 and the pole base 31 is rotatably supported on an outer surface of the above-mentioned manual valve shaft 5 by means of metal bushings 57, 59 of the support portions 53, 55.

Positioning surfaces 61, 63 in the circumferential direction and positioning surfaces 65, 67 in the axial direction are formed on the inner surface side of the above-mentioned pole base 31 and the relative positions of the shoulder portions 25, 27 of the above-mentioned movable element 23 are determined in the circumferential direction and in the axial direction by means of the positioning surfaces 61,63 and the positioning surfaces 65,67. Further, a recessed portion 69 which constitutes a stopper together with the above-mentioned protruding portion 29 is formed in the pole base 31. The stopper constituted by this protruding portion 29 and the recessed portion 69 is provided for setting the relative rotation of the permanent magnet 19 to the magnetic sensor 21 within a predetermined angle.

Figure 5:
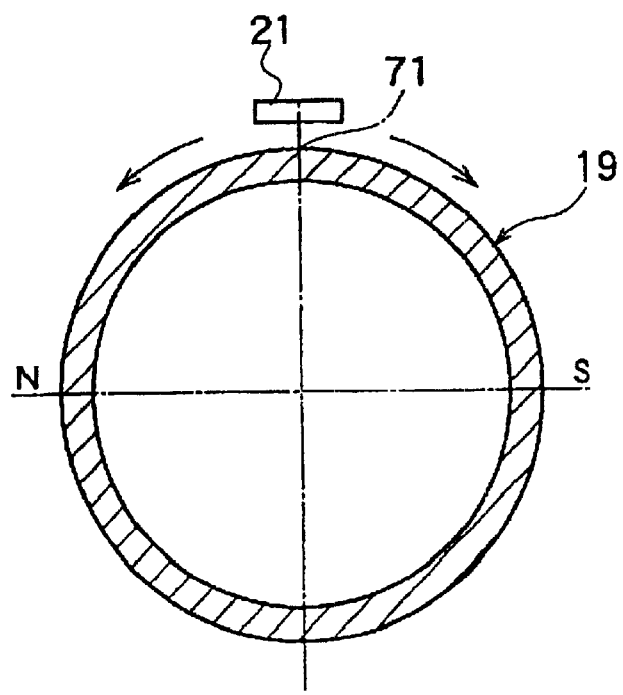
FIG. 5 is a side view showing a magnetic boundary surface of a permanent magnet according to the first embodiment.
Figure 6:
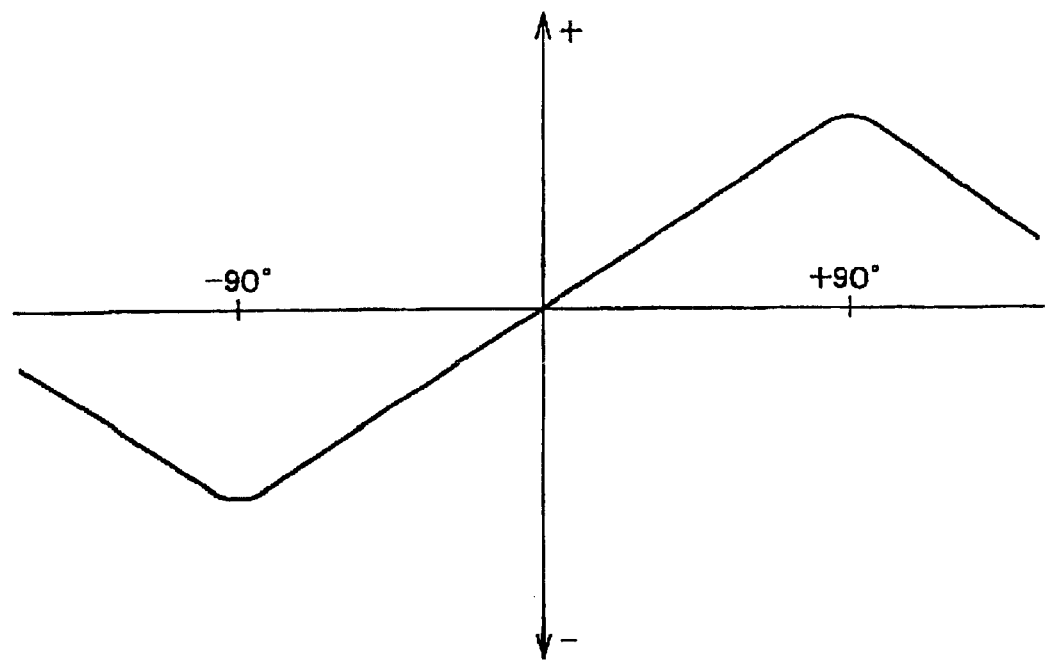
FIG. 6 is a graph showing the change in an output voltage value generated by the rotation of the permanent magnet according to the first embodiment.

The above-mentioned permanent magnet 19 is magnetized such that a magnet formed in a ring shape as shown in FIG. 5 has an N pole and an S pole. The center disposed between these N pole and the S pole constitutes a magnetic boundary surface 71. The above-mentioned permanent magnet 19 is arranged relative to the above-mentioned magnetic sensor 21 using the above-mentioned magnetic boundary surface 71 as a reference position. Further, the permanent magnet 19 is set such that the permanent magnet 19 performs the relative rotation to the magnetic sensor 21 in the both-side directions of the boundary surface 71 as shown in arrows. The change in an output voltage brought about by this relative rotation becomes as shown in FIG. 6, for example. With respect to this change, although the linearity of the voltage value is lost in the vicinity of the ±90 degrees, the linear change in the voltage value can be outputted in a range of approximately 150 degrees between these portions.

Figure 7:
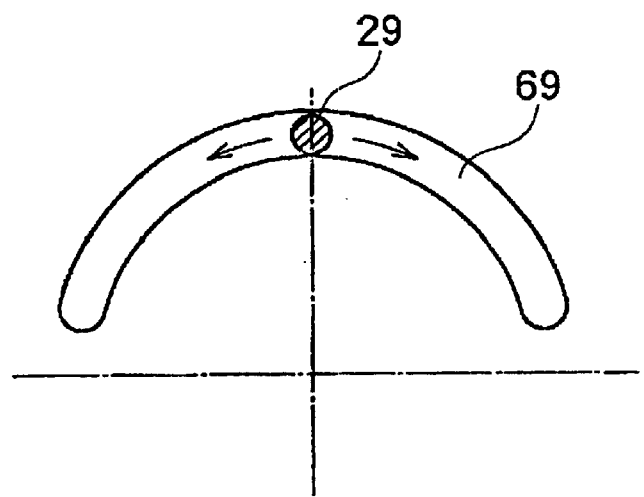
FIG. 7 is an explanatory view of a stopper according to the first embodiment.

Then, the above-mentioned stopper constituted by the protruding portion 29 and the recessed portion 69 regulates the rotation within this linear range and, as shown in FIG. 7, the recessed portion 69 is formed in an arcuate shape in a fixed range. The rotational angle regulated by the stopper can be arbitrarily selected.

Figure 8:
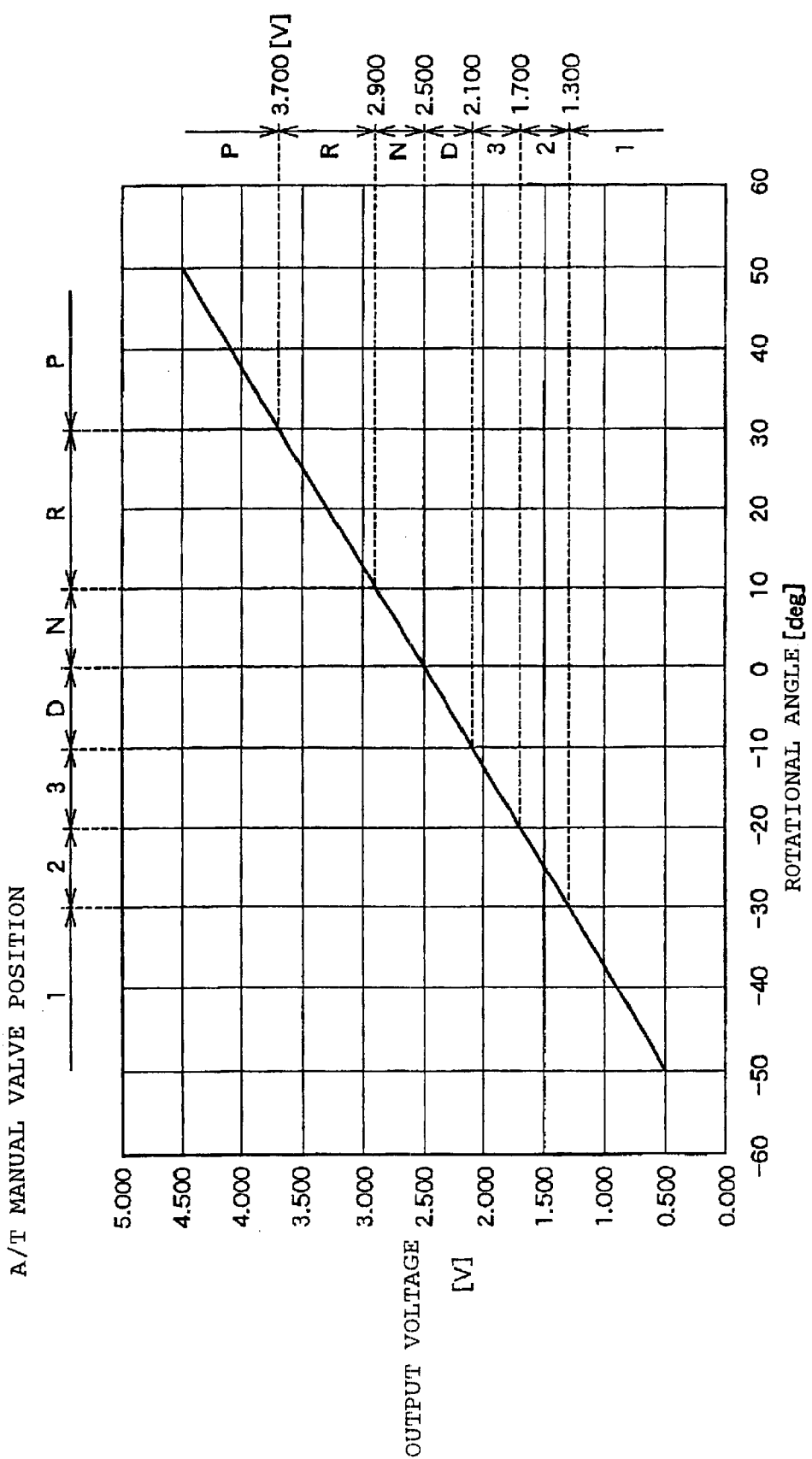
FIG. 8 is a graph showing the relationship between change gear range positions and the output voltage according to the first embodiment.

Then, when the manual valve shaft 5 is rotated upon manipulation of the shift lever 11 shown in FIG. 1 by way of the connecting lever 9, the manual valve is operated and the change gear mechanism 17 is changed over to an instructed change gear range position. Here, the permanent magnet 19 performs the relative rotation to the magnetic sensor 21 and the linear change in the voltage value is outputted to a control part by way of the lead terminal 33 and the connector terminal 41. The relationship among the change gear range positions P, R, N, D, 3, 2, 1 is shown in FIG. 8.

For example, the boundary value at which the P range is changed over to the R range is set to 3.700 V and the boundary value at which the R range is changed over to the N range is similarly set to 2.900 V. In the similar manner, the boundary value at which the N range is changed over to the D range is set to 2.500 V, the boundary value at which the D range is changed over to the 3 range is set to 2.100 V, the boundary value at which the 3 range is changed over to the 2 range is set to 1.700 V, and the boundary value at which the 2 range is changed over to the 1 range is set to 1.300 V. However, these numerical values constitute one example and these values can be freely set depending on individual cars.

In this manner, the inhibitor switch 1 according to the embodiment of the present invention can detect the change gear range positions of the automatic transmission 3 in a non-contacting state using the permanent magnet 19 and the magnetic sensor 21 so that there is no wear on switching portions and there is no occurrence of noises in slide portions or the like whereby the reliability can be remarkably enhanced and the detection accuracy can be stabilized. Further, since the linear change in the voltage value can be outputted with the use of the permanent magnet 19 and the magnetic sensor 21 which detects a magnetic force of the permanent magnet 19 in a non-contacting state, the change gear range positions can be accurately detected by making use of the difference of the detected voltage values at respective change gear range positions.

Further, since there is no possibility that the signal of the R range is erroneously outputted when the change gear mechanism 17 is changed over from N range to the D range, the detection of the changeover of the change gear range positions can be performed accurately.

Further, since the linear change in the voltage value can be outputted even at an intermediate position in the course of performing the changeover of the change gear range positions, it becomes possible to detect the change gear range position direction in which the change gear mechanism 17 is currently being changed over by the shift lever 11. Accordingly, in the midst of the changeover operation from the N range to the D range, when an abnormal signal is generated and it is judged that a failure occurs, it becomes possible to forcibly fix the change gear range of the automatic transmission 3 to the D range or return such a change gear range to the N range by means of the control device. When the change gear mechanism 17 is fixed to the D range, it is made to agree with the manipulation will of a driver at the point of time so that it becomes possible to continue the travelling. Accordingly, the driver who judges that failure occurs keeps on driving his automobile and can carries the automobile to a repair shop. When the change gear mechanism 17 is fixed to the N range, the automobile may be carried to a repair shop or the like by drawing the automobile using other car. Also, with respect to a failure mode between other change gear range positions, by detecting the change gear range direction in which the change gear mechanism 17 is manipulated, a control similar to the above-mentioned control can be performed.

Further, since the linear change in voltage value can be outputted, even when the change gear range positions are further increased in number, the inhibitor switch 1 can easily cope with this situation only by dividing the corresponding voltage value so that there is no possibility that the inhibitor switch 1 will become large-sized.

Basically one magnetic sensor 21 is sufficient so that the structure becomes extremely simple and it become possible to largely miniaturize the magnetic sensor 21 as a whole. Accordingly, as shown in FIG. 1, even in the inside of the mission case 7 where other parts are densely arranged thus defining a least space therein, the magnetic sensor 21 can be easily mounted therein so that the freedom of designing can be largely increased. When the magnetic sensor 21 is arranged in the inside of the mission case 7, the mission case 7 per se can protect the inhibitor switch 1 from the outside.

In addition to the above, according to the embodiment of the present invention, by making the shoulder portions 25, 27 of the movable element 23 face the positioning surfaces 61, 63, 65, 67 of the pole base 31 in an opposed manner, the movable element 23 can be accurately positioned to the pole base 31 in the axial direction as well as in the radial direction. Further, magnetic sensor 21 can be positioned in the inside of the recessed portion 34 of the movable element 31. Accordingly, the relative position in the radial direction as well as in the axial direction between the permanent magnet 19 and the magnetic sensor 21 can be accurately determined. Particularly, by performing the positioning in the radial direction, the clearance between the permanent magnet 19 and the magnetic sensor 21 can be accurately maintained so that an outputting of the linear voltage value can be accurately maintained.

The positioning in the circumferential direction between the above-mentioned permanent magnet 19 and the movable element 23 can be accurately determined by the fitting engagement between the recessed portion 20 and the protruding portion 24 so that the arrangement of the permanent magnet 19 relative to the magnetic sensor 21 using the magnetic boundary surface 71 as the reference can be accurately maintained whereby the accurate detection can be maintained for a long period.

Since the above-mentioned relative rotation of the movable element 23 to the pole base 31 can be regulated by the stopper function obtained by the protruding portion 29 and the recessed portion 69, the accurate detection can be maintained.

In an assembling, the body 47 and the lid body 49 of the pole base 31 are separated and the magnetic sensor 21 is fitted into the recessed portion 34 before the inside of the recessed portion 37 is sealed by the resin 45. Here, the lead terminal 33 of the magnetic sensor 21 has the distal end 39 thereof pulled into the inside of the recessed portion 37 through the through hole 35 at the pole base 31 side. In such a state, the distal end 39 of the lead terminal 33 is electrically connected to the distal end 43 of the connector terminal 41 by soldering or the like. Thereafter, the recessed portion 37 is sealed with the resin 45.

Then, the movable element 23 is fitted into the inside of the body 47 of the pole base 31 and the shoulder portion 27 is supported on the positioning surfaces 63, 67. Then, the lid body 49 of the pole base 31 is abutted to the body 47 and the shoulder portion 25 of the movable element 23 is supported on the positioning surfaces 61, 65. Thereafter, the flange portions 50, 48 of the body 47 and the lid body 49 of the pole base 31 are fastened by means of small bolts 52 so as to integrally join both of them.

In this manner, the inhibitor switch 1 of the embodiment according to the present invention has an extremely simple structure and the assembling thereof is also extremely easy.

When the inhibitor switch 1 is arranged in the inside of the mission case 7 as mentioned above, although there is a possibility that oil intrudes through the joining surface 51, no large dust intrudes into the inside of the pole base 31 so that there is no possibility that it gives rise to a trouble in the detection performed by the magnetic sensor 21.

Figure 9:
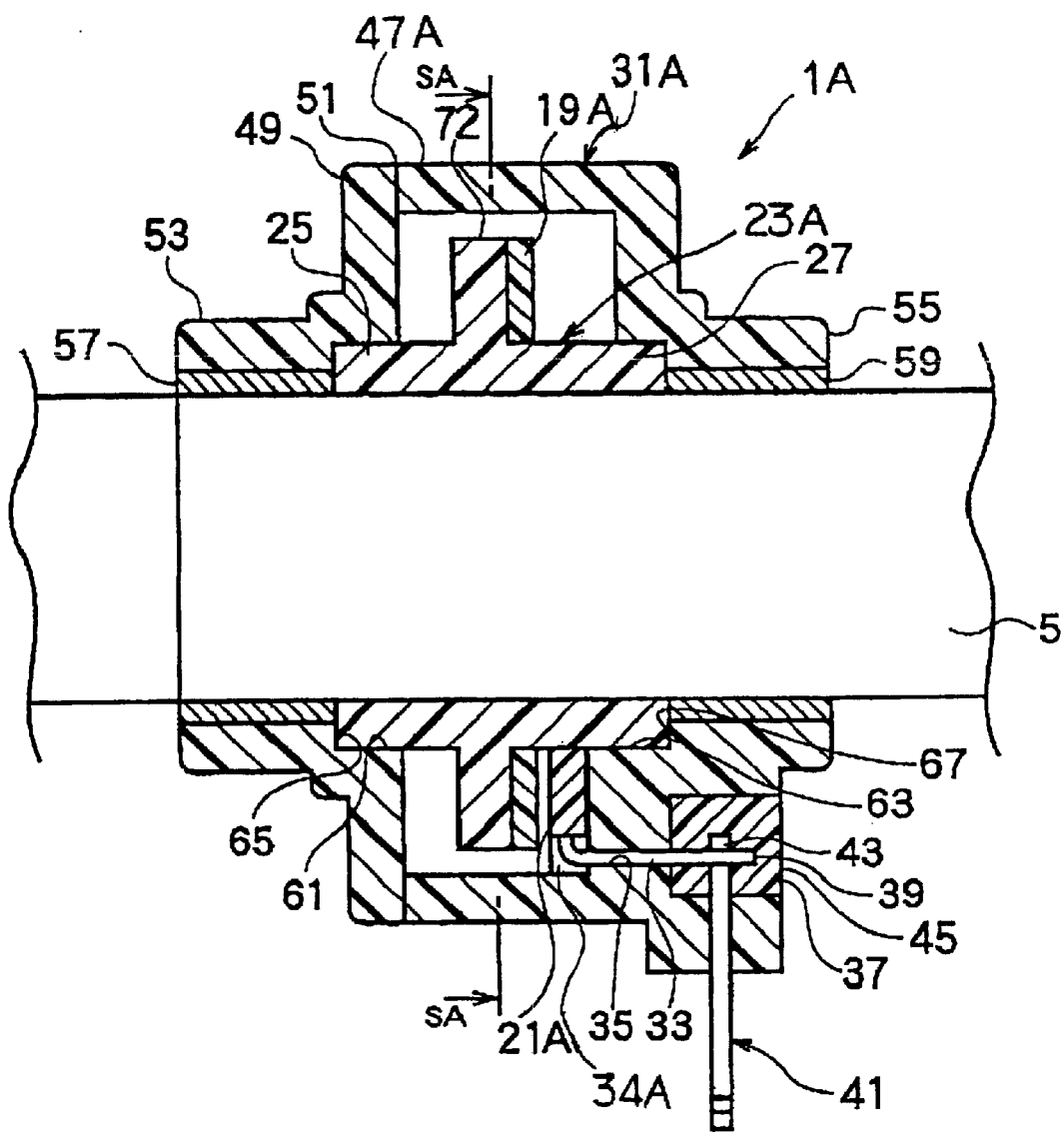
FIG. 9 is a whole cross-sectional view according to an embodiment which constitutes a modification of the first embodiment.
Figure 10:
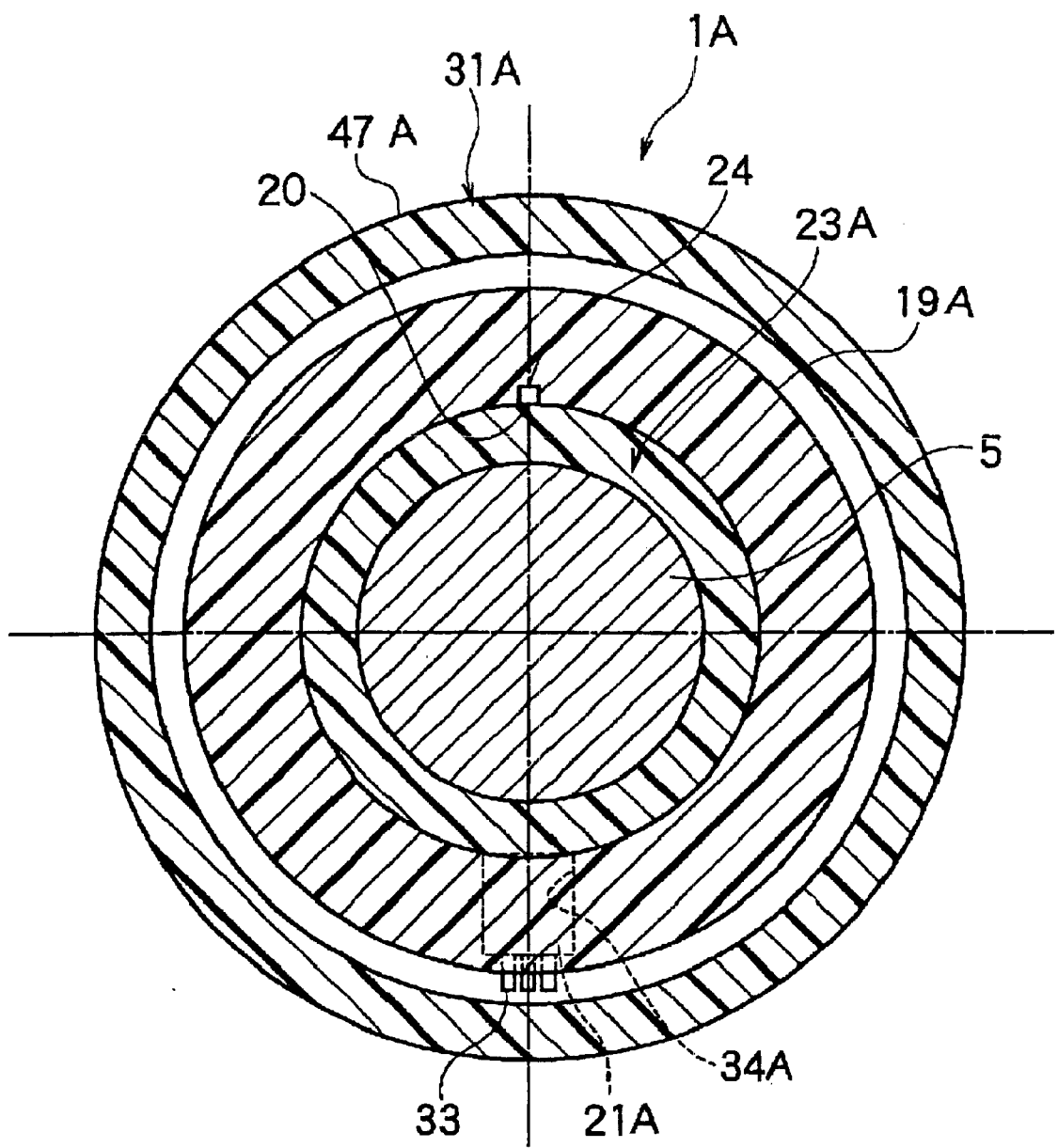
FIG. 10 is a cross-sectional view as viewed from a line SA—SA of FIG. 9.

FIG. 9 and FIG. 10 show an embodiment which constitutes a modification of the first embodiment, wherein FIG. 9 is a whole cross-sectional view and FIG. 10 is a cross-sectional view as viewed from a line SA—SA of FIG. 9. Constitutional parts which correspond to those of the above-mentioned embodiments are explained while being indicated by same symbols.

In an inhibitor switch 1A according to this embodiment, a permanent magnet 19A and a magnetic sensor 21A are made to face each other in an opposed manner in the axial direction. That is, a flange portion 72 is formed on a movable element 23A in a protruding manner in the circumferential direction and the donut-plate-shaped permanent magnet 19A is supported on this flange portion 72. The relative positioning between the movable element 23A and the permanent magnet 19A in the circumferential direction can be performed by the fitting engagement between the recessed portion and the protruding portion as in the case of the above-mentioned embodiment.

The magnetic sensor 21A is fitted into a recessed potion 34A formed in an inner surface of a body 47A of a pole base 31A and is fixedly secured to the recessed portion 34A. A lead terminal 33 of the magnetic sensor 21A is bent and is pulled out toward a recessed portion 37 side.

Then, in this embodiment also, due to the change in relative position in the circumferential direction between the permanent magnet 19A and the magnetic sensor 21A, the linear change in voltage value can be outputted so that the similar manner of operation and advantageous effect can be obtained.

On the other hand, in this embodiment, since the permanent magnet 19A and the magnetic sensor 21A are arranged in the axial direction such that they face each other in an opposed manner, the inhibitor switch 1A can be miniaturized in the radial direction.

Second Embodiment

Figure 11:
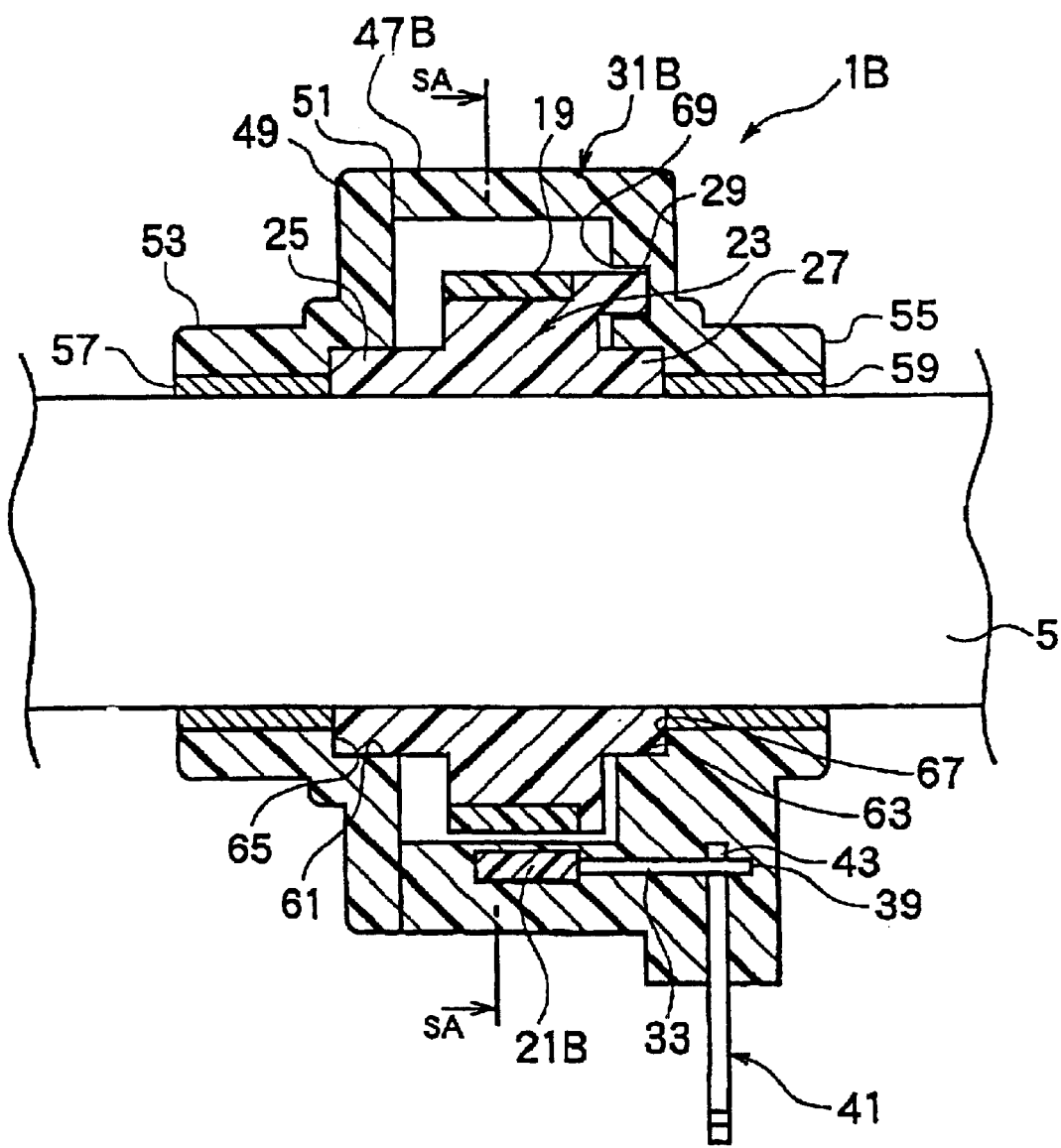
FIG. 11 is a whole cross-sectional view according to a second embodiment of the present invention.
Figure 12:
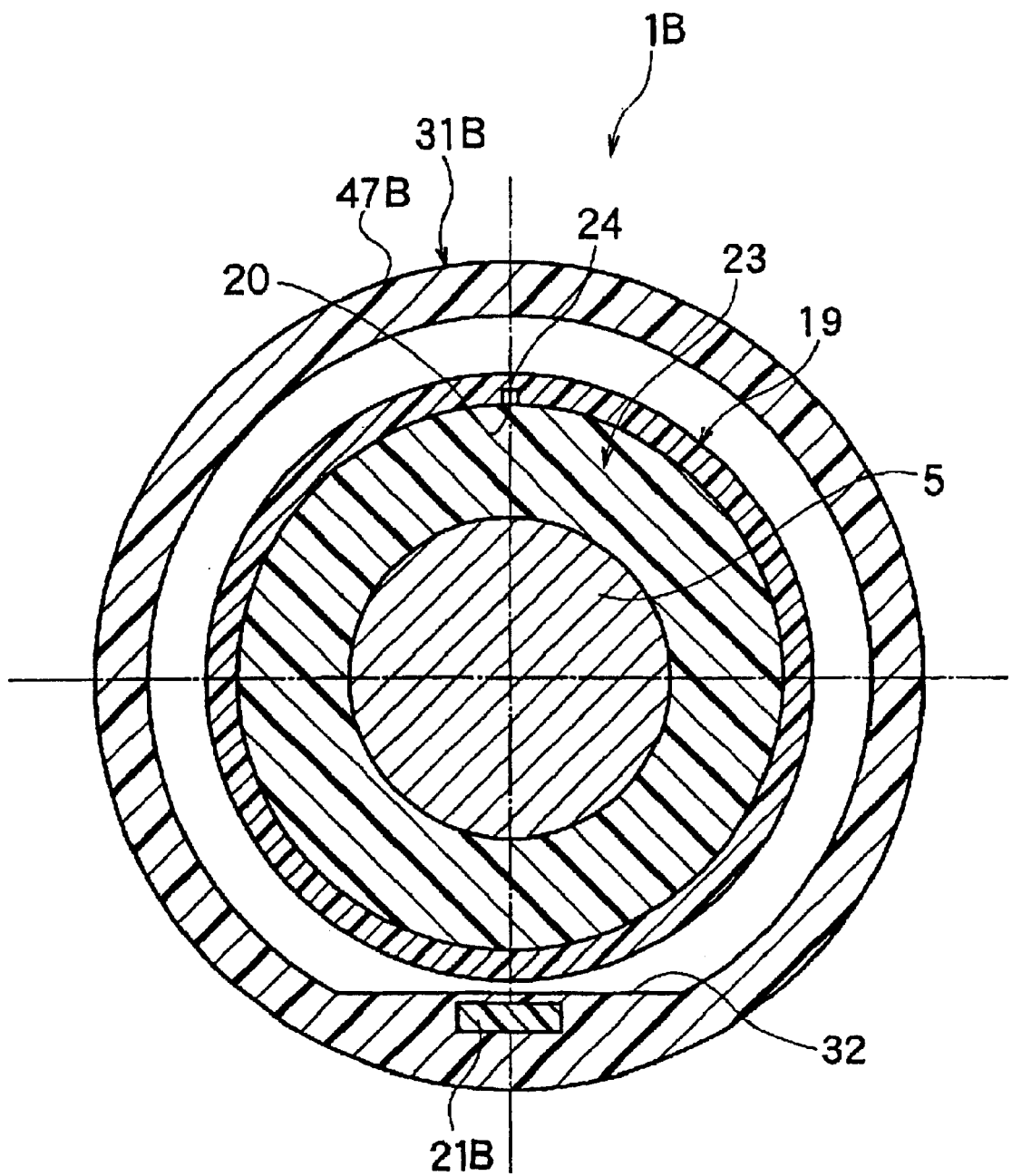
FIG. 12 is a cross-sectional view as viewed from a line SA—SA of FIG. 11.

FIG. 11 and FIG. 12 show the second embodiment of the present invention wherein FIG. 11 is a whole cross-sectional view and FIG. 12 is a cross-sectional view as viewed from SA—SA of FIG. 11. Constituent parts which correspond to those of above-mentioned embodiment are explained while being indicated by same symbols.

In an inhibitor switch 1B of this embodiment, a magnetic sensor 21B is arranged in the inside of a pole base 31B in an embedded form by an insert molding. In manufacturing, first of all, distal ends 39, 43 of a lead terminal 33 of the magnetic sensor 21B and a connector terminal 41 for an external connection are electrically connected by caulking or a high-temperature soldering or a spot welding each other. These connected magnetic sensor 21B and connector terminal 41 are set in the inside of a mold. The magnetic sensor 21B and connector terminal 41 are positioned and fixedly secured by a portion of the mold. Thereafter, an injection mold is performed so as to form a body 47B of the pole base 31B by molding.

Due to such a constitution, the magnetic sensor 21B is embedded in a wall portion of the body 47B of the pole base 31B and hence is shielded from an outside atmosphere. Accordingly, it is unnecessary to make a joining portion 51 between the body 47B and a lid body 49 of the pole base 31B have a hermetic structure, airtight/watertight structure so that the assembling is further facilitated and the manufacturing cost can be reduced.

Since the magnetic sensor 21B is shielded from the external atmosphere, even when the inhibitor switch 1B is arranged outside a transmission case 7 and is used in a state that it is immersed in water or the inhibitor switch 1B is arranged in the inside of the transmission case 7 and hence is in a state that it is immersed in an ATF, the use of the inhibitor switch 1B can be continued.

Figure 13:
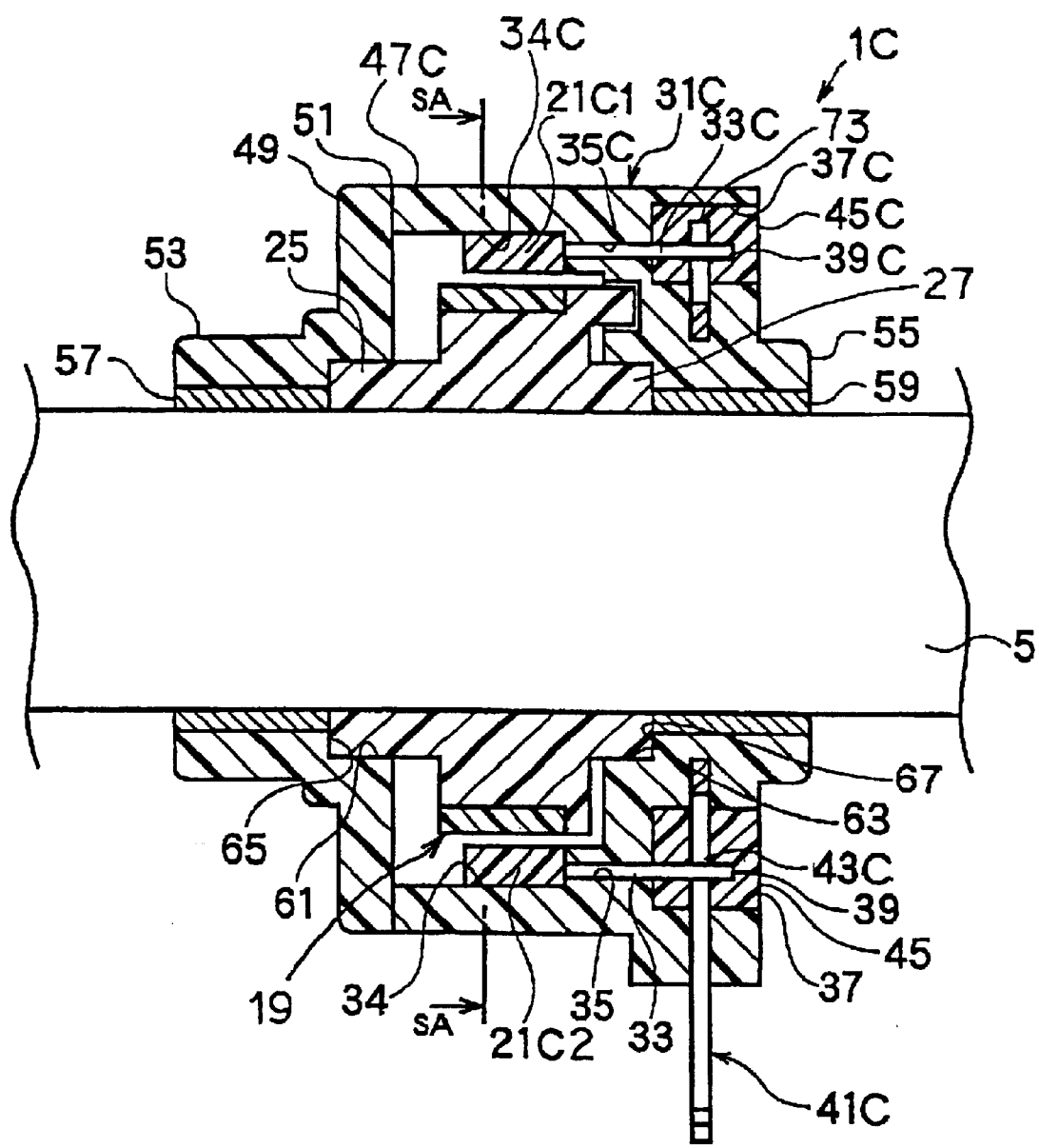
FIG. 13 is a whole cross-sectional view according to a third embodiment of the present invention.
Figure 14:
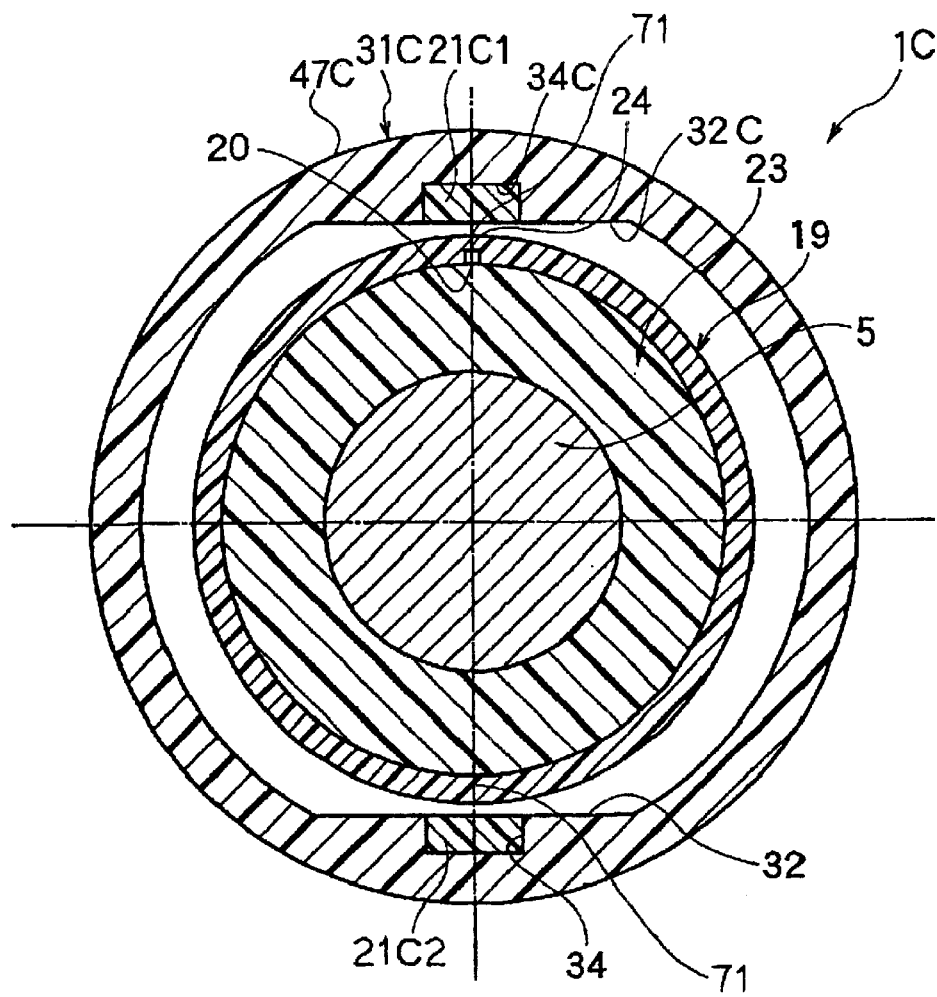
FIG. 14 is a cross-sectional view as viewed from a line SA—SA of FIG. 13.

Initial irregularities in mounting the magnetic sensor 21B can be decreased so that the mounting accuracy can be enhance whereby the accurate detection can be performed.
Third Embodiment FIG. 13 to FIG. 17 show the third embodiment of the present invention wherein FIG. 13 is a whole cross-sectional view and FIG. 14 is a cross-sectional view as viewed from SA—SA of FIG. 13. Constituent parts which correspond to those of above-mentioned embodiment are explained while being indicated by same symbols.

As shown in FIG. 13 and FIG. 14, in an inhibitor switch 1C of this embodiment, magnetic sensors 21C1, 21C2 are provided in a plural number corresponding to the number of magnetic boundary surfaces of the permanent magnet 19. That is, a pair of upper and lower magnetic sensors 21C1, 21C2 are provided corresponding to the magnetic boundary surfaces 71 of the permanent magnet 19. The constitution of the lower-side magnetic sensor 21C2 is equal to that of the magnetic sensor 21 of the above-mentioned first embodiment. That is, a distal end 43C of a connector terminal 41C for an external connection which is integrally supported on the above-mentioned pole base 31C by an insert molding is pulled into the above-mentioned recessed portion 37 and is electrically connected to a distal end 39 of the above-mentioned lead terminal 33 by soldering or the like. The upper-side magnetic sensor 21C1 also has the similar constitution. That is, the magnetic sensor 21C1 is assembled in a recessed portion 34C of the pole base 31C and the lead terminal 33C has a distal end 39C thereof pulled into a recessed portion 37C formed in an outer surface of the pole base 31C through a through hole 35C of the pole base 31C. Further, the above-mentioned recessed portion 37C is sealed with resin 45C such as epoxy resin, urethane, or the like. Accordingly, in this embodiment, as shown in FIG. 13, the electrical connecting portions to the connector terminal 41C are provided at two portions disposed in the inside of the recessed portions 37, 37C of the body 47C of the pole base 31C.

Figure 15:
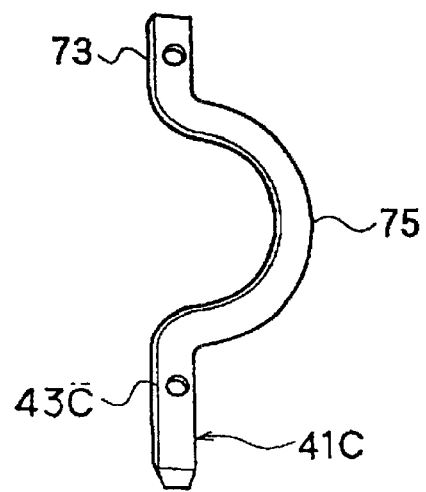
FIG. 15 is a perspective view of a connector terminal according to the third embodiment.

The specific shape of the above-mentioned connector terminal 41C is shown in FIG. 15 which is a perspective view. That is, the connector terminal 41C is integrally formed by joining the distal ends 73, 43C for connection which are positioned above and below by means of an arcuate portion 75. This connector terminal 41C is formed in the inside of the body 47C of the pole base 31C by an insert molding wherein the arcuate portion 75 is arranged such that the arcuate portion 75 is turned around a bushing 59.

Figure 16:
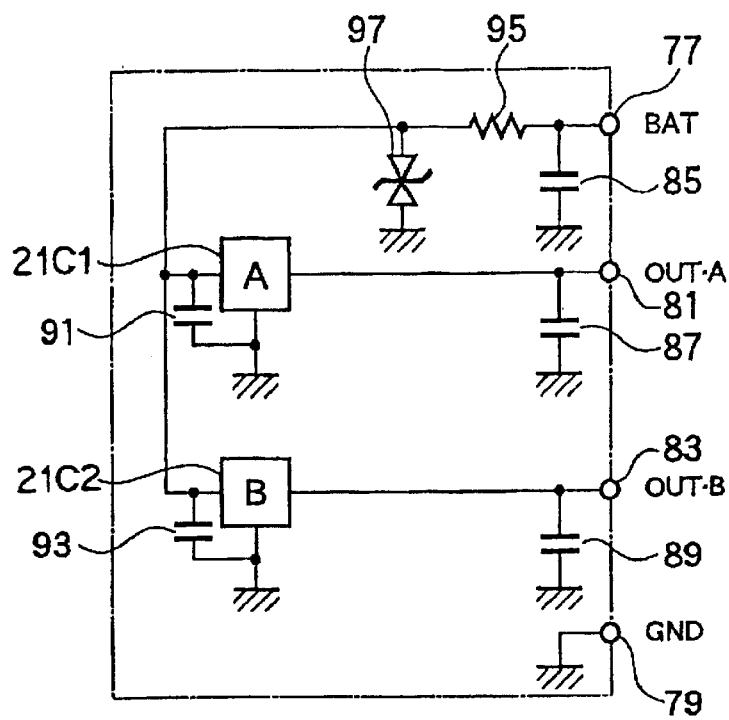
FIG. 16 is a circuit diagram of the magnetic sensor according to the third embodiment.

The circuit constitution of such magnetic sensors 21C1, 21C2 adopts a constitution shown in FIG. 16. That is, both sensors 21C1, 21C2 are arranged in parallel between a terminal 77 connected to a battery and a ground terminal 79 and linear changes of voltage values detected by respective magnetic sensors 21C1, 21C2 are respectively and simultaneously outputted from output terminals 81, 83 of respective magnetic sensors 21C1, 21C2. In FIG. 16, the circuit constitution is provided with capacitors 85, 87, 89, 91, 93, a resistor 95 and a TRIAC 97 for the protection of electronic components and for the prevention of noises. The connector terminal 41C is used as the terminal 77 connected to the above-mentioned battery and the ground terminal 79. To the output terminals 81, 83 of respective magnetic sensors 21C1, 21C2 which output detection signals, signal lines are connected so that signals are taken out separately.

Figure 17:
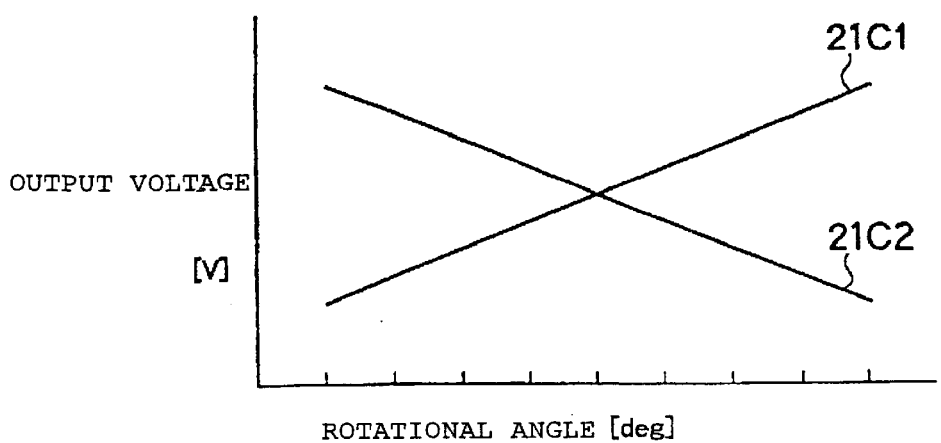
FIG. 17 is a graph showing the relationship between a rotational angle and an output voltage value according to the third embodiment.
Figure 18:
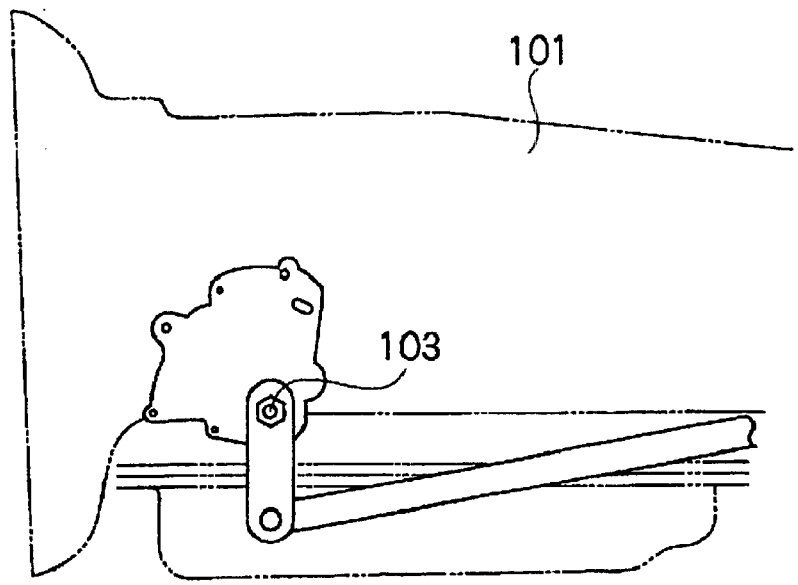
FIG. 18 is a schematic view of an automatic transmission according to a conventional example.
Figure 19:
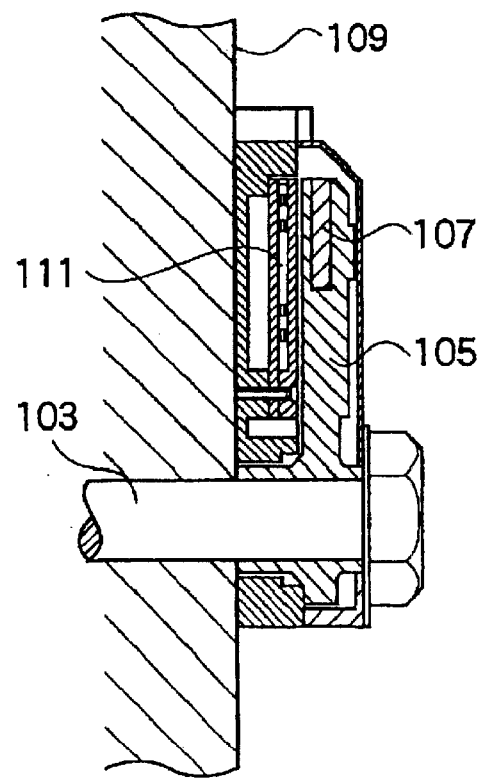
FIG. 19 is a cross-sectional view showing amounting state of an inhibitor switch according to the conventional example.
Figure 20:
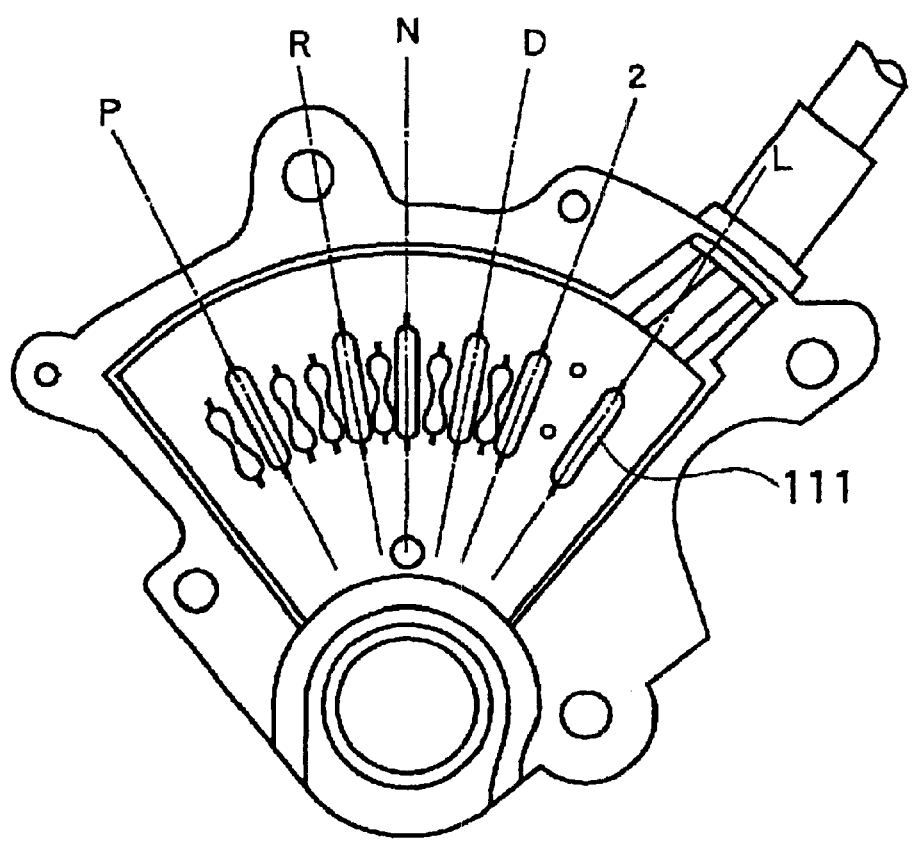
FIG. 20 is a front view showing contacts of the inhibitor switch according to the conventional example.

The outputs of voltage values obtained by the above-mentioned respective magnetic sensors 21C1, 21C2 are shown in FIG. 17. By simultaneously observing both output values of these magnetic sensors 21C1, 21C2, a further accurate detection can be performed by comparing both output signals. Further, even when either one of the magnetic sensors 21C1, 21C2 suffers from a failure and hence becomes inoperable, so long as the other magnetic sensor 21C1, 21C2 is operable, the outputting of linear voltage value can be performed so that the accurate detection of the change gear range position can be continued.

Although the permanent magnet is formed in a ring shape or a donut-plate shape and are arranged in the above-mentioned embodiments, the permanent magnet may be formed in an arcuate shape or a belt shape and magnetic sensors are constituted such that they are movable relative to this arcuate or belt-shaped permanent magnet. Even with such a constitution, the linear outputting of the voltage value can be performed and, at the same time, the accurate detection of the change gear ranges can be performed. However, when the belt-shaped permanent magnet is used, the magnetic sensor is to be constituted such that they perform the relative movement linearly along the permanent magnet by converting the rotation of the manual valve shaft to the linear movement. It may be possible to adopt a constitution in which the above-mentioned magnetic sensor 21 is mounted on the manual valve shaft side and the permanent magnet 19 is mounted on the transmission case 7 side.

What is claimed is:

1. An inhibitor switch comprising a permanent magnet and a magnetic sensor which detects a magnetic force of said permanent magnet in a non-contacting state and outputs a linear change in a voltage value in response to a change in a relative position between said permanent magnet and said magnetic sensor, wherein:

either one of said permanent magnet and said magnetic sensor is mounted on a manual valve shaft side for changing over a change gear range position of an automatic transmission by operating a manual valve of said automatic transmission in an interlocking manner with said manual valve shaft, and the other one of said permanent magnet and said magnetic sensor is mounted on a transmission case side of said automatic transmission, and said change gear range position of said automatic transmission is detectable in response to an output of said voltage value corresponding to said change gear range position.

2. An inhibitor switch according to claim 1, wherein said permanent magnet is mounted in a ring form on a movable element made of a non-magnetic material which is supported such that said movable element is integrally rotatable with said manual valve shaft, and said magnetic sensor is mounted on a pole base made of a non-magnetic material which is fixedly supported on said transmission case side.

3. An inhibitor switch according to claim 2, wherein said permanent magnet has a magnetic boundary surface between an S pole and an N pole, and said permanent magnet is arranged relative to said magnetic sensor using said boundary surface as a reference position and said permanent magnet is capable of performing a relative rotation relative to said magnetic sensor in the directions of both sides of said boundary surface.

4. An inhibitor switch according to claim 3, wherein a stopper is provided between said pole base and said movable element so as to set the relative rotation of said permanent magnet to said magnetic sensor within a predetermined angle.

5. An inhibitor switch according to any one of claim 2, 3 or 4, wherein a lead terminal of said magnetic sensor has a distal end thereof pulled into a recessed portion formed in an outer surface of said pole base and a distal end of a connector terminal for an external connection which is supported on said pole base is pulled into said recessed portion and is electrically connected to said distal end of said lead terminal, and said recessed portion is sealed with resin.

6. An inhibitor switch according to any one of claim 2, 3 or 4, wherein said pole base is formed of resin by molding and said magnetic sensor is arranged in said pole base in an embedded form by an insert molding.

7. An inhibitor switch according to claim 2, wherein said magnetic sensor comprises a plurality of magnetic sensors which are provided corresponding to a number of magnetic boundary surfaces of said permanent magnet.

* * * * *